United States Patent Office 3,649,677
Patented Mar. 14, 1972

3,649,677
PROCESS FOR PREPARING BETAINES
Peter Morris, Whitley Bay, Northumberland, England, assignor to The Procter & Gamble Company, Cincinnati, Ohio
No Drawing. Filed Dec. 19, 1968, Ser. No. 785,393
Claims priority, application Great Britain, Jan. 10, 1968, 1,441/68
Int. Cl. C07c *101/00*
U.S. Cl. 260—501.13     11 Claims

ABSTRACT OF THE DISCLOSURE

A process for preparing betaines in improved yields comprising admixing a tertiary amine of the formula $R_1R_2R_3N$ wherein $R_1$ is alkyl of about 10 to about 18 carbon atoms and $R_2$ and $R_3$ are each alkyl of 1 to about 3 carbon atoms with an amount of water sufficient to provide a stirrable reaction mixture; heating the mixture at a temperature of about 20° C. to about 110° C.; adding at a pH of about 6.0 to about 9.0 at least a stoichiometric amount with respect to said amine of a substantially dry, particulate salt of the formula $XR_4COOM$ wherein X is halogen, $R_4$ is alkylene of 1 to about 4 carbon atoms and M is alkali metal or ammonium; and continuing said heating while maintaining the pH within the range of about 6.0 to about 9.0 until the reaction is substantially complete. The betaines prepared by this process possess useful detergency properties and can be employed in the preparation of detergent compositions.

FIELD OF THE INVENTION

This invention relates to a process for preparing betaines. More particularly, it relates to an improved process of preparing betaines having desirable surface active properties.

The reaction of tertiary amines with salts of halocarboxylic acids to produce betaine compounds is well known. See, for example, British Pats. 446,416 (Apr. 22, 1936); 464,657 (Apr. 21, 1937); and 1,087,415 (Oct. 18, 1967). The prior art processes for preparing betaines have often been conducted in aqueous solution with an organic co-solvent the use of which has necessitated the employment of a solvent stripping step. Moreover, the yields obtainable have not been entirely satisfactory.

It is an object of the present invention to provide betaines by reaction of a tertiary amine and a halocarboxylic acid salt without the use of an organic solvent.

It is another object of the present invention to provide a process for preparing betaines characterized by almost complete conversion of the amine to the betaine compound.

Other objects of this invention will be apparent from consideration of the invention which is more fully described hereinafter.

SUMMARY OF THE INVENTION

These and other objects of the present invention are achieved by the provision of a process of preparing betaines which comprises reacting a tertiary amine with a salt of a halocarboxylic acid under carefully controlled reaction conditions. The present invention is based in part on the discovery that the employment of a substantially dry particulate salt of the halocarboxylic acid in stoichiometric excess with respect to the amine reactant under carefully controlled condition of pH and temperature makes possible almost complete, e.g. in excess of 99%, conversion of the amine to the desired betaine compound.

According to the present invention there is provided a process for preparing compounds of the formula:

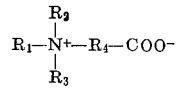

by reaction of a tertiary amine of the formula $R_1R_2R_3N$ with a salt of a halocarboxylic acid of the formula $XR_4COOM$, in which formula $R_1$ is alkyl of about 10 to about 18 carbon atoms,
$R_2$ and $R_3$ are each alkyl of 1 to about 3 carbon atoms,
$R_4$ is alkylene of 1 to about 4 carbon atoms,
X is halogen and
M is alkali metal or ammonium.

The process of this invention comprises admixing a tertiary amine of the hereinbefore described formula with an amount of water sufficient to provide a stirrable reaction mixture; heating the mixture at a temperature of about 20° C. to about 110° C.; adding at a pH of about 6.0 to about 9.0 at least a stoichiometric amount with respect to said amine of a substantially dry, particulate halocarboxylic acid salt of the hereinbefore described formula; and continuing said heating with stirring while maintaining the pH within the range of about 6.0 to about 9.0 until the reaction is substantially complete.

A reaction temperature of at least 40° C. is normally desirable.

The preferred betaine derivatives herein are those obtained from alkyl dimethyl amines wherein the alkyl chain has from 10 to 14 carbon atoms. Preferably the alkyl has 12 to 14 carbon atoms. Also preferred are mixtures of such amines. The halogen X is preferably chlorine, $R_4$ is preferably —$CH_2$—. The cation M is preferably sodium or potassium. Sodium chloracetate is very suitable as the salt of the halocarboxylic acid.

In carrying out the process according to the invention, the amount of water with which the tertiary amine is first mixed is not critical, provided there is at least enough to give a stirrable reaction mixture throughout the reaction. Addition of enough water to provide a reaction product having about 20–35% of betaine derivatives by weight is often convenient, for instance, and about 2 to 3 parts by weight of water per part of tertiary amine. The mixture, which at this stage is normally a two phase dispersion of the amine in water, is heated to the reaction temperature with stirring.

Either together with the water or after it has been added, enough alkali is added so that the pH of the reaction mixture immediately after admixture of the salt of halocarboxylic acid will fall within the required range. The amount of alkali necessary depends upon the nature and purity of the salt used, and is easily found by experiment. If the reaction mixture is heated, the alkali is added before, during or after the heating to reaction temperature.

To the mixture is added at least the stoichiometric amount of substantially dry, particulate salt of halocarboxylic acid. By addition of the salt dry at this stage, there is avoided any hydrolysis of the salt before it comes into contact with the amine. The particle size of the salt is not critical, but it is preferably in the form of fine crystals or powder. At first it is partly insoluble in the two phase amine-water mixture, but the reaction soon becomes homgoeneous as reaction proceeds. Immediately after addition of the salt the pH of the mixture is preferably within the range 7–8, especially 7.5 to 8, and it is preferably maintained within these ranges throughout the reaction. This may be achieved by adding alkali continuously or intermittently to the reaction mixture. Use of pH less than 7 restricts the reaction of the salt of halocarboxylic acid with the amine, because, it is believed, the amine is partially protected by formation of an amine salt in acid conditions. Use of pH higher than 8 tends to promote hydrolysis of the salt of halocarboxylic acid. However, a somewhat wider pH range, e.g. from 6 to 9, can be tolerated, especially for short periods, at the expense of a slight loss of completeness of reaction of the tertiary amine.

The reaction mixture is maintained at the reaction temperature, with stirring, until the reaction is substantially complete, and during this period the pH is controlled within the above range by continuous or intermittent addition of aqueous alkali, such as aqueous caustic soda. The reaction temperature employed ranges from about room temperature, 20° C. to about the boiling point of the reaction mixture at atmospheric pressure, i.e. up to about 110° C.

While conversion of about 90% of the amine to betaine can be obtained by using the process of the invention without excess of halocarboxylic acid salt, for maximum conversion an excess over the stoichiometrical amount is required. Usully 20 to 30% molar excess is used, preferably from 20–25%. Amounts over about 30% confer little or no further benefit. The exact least amount required to give substantially complete conversion, for example over 99%, depends to some extent upon the reaction temperature and time employed. Thus at higher temperature, approaching the boiling point, i.e. a little over 100° C., a molar excess of 25% gives substantially complete conversion and a reaction time of about 1½ to 3 hours is often suitable. However, a reaction time of up to about 5 hours may be required particularly with the longer chain amines, such as those wherein $R_1$ has 16 to 18 carbon atoms. At 70° C., 20% molar excess gives similar conversion, but the reaction time required is about 10 hours. Preferred temperatures are over 70° C., particularly over 80° C. Lower temperatures can be used, e.g., down to 40° C. or lower if even longer reaction times, with the corresponding increase in the size of reaction vessel etc. for a given overall production rate, are acceptable. Temperatures higher than the boiling point at atmospheric pressure would involve both use of pressure vessels and a greater excess of salt of halocarboxylic acid. It has been found convenient to operate the process with the reaction mix boiling at atmospheric pressure under reflux.

The immediate product of the process is a solution or mixture of the betaine derivative, together with alkali metal or ammonium halide, for example sodium chloride, and small amounts of the products of hydrolysis of the salt of the halocarboxylic acid, and normally contains only traces of unreacted amine. It can be used as such for many purposes, for example in the preparation of detergent compositions, or if desired the betaine derivative can be recovered from it by conventional methods.

The process of the invention is illustrated by the following examples.

Example I 300 g. of dodecyldimethylamine were placed in a stirred reaction vessel open to atmosphere via a reflux condenser, and 600 g. of an aqueous solution of 4 g. of sodium hydroxide per liter were added. The mixture was heated to boiling point, and 204 g. of sodium chloracetate, in fine crystalline form, were added and mixed in. Immediately after mixing the sodium chloracetate, the pH of the reaction mix was 8. The mixture was then stirred and kept boiling under reflux for three hours, and during this period a total of 63 g. of an aqueous solution of 400 g. sodium hydroxide per liter was added in small increments intermittently so that the pH of the mixture was always within the range 7.5 to 8. The reaction mixture was clear and fluid at the reaction temperature. It contained 32% betaine derivative and 0.03% free amine corresponding to 99.8% conversion of amine to betaine.

Substantially similar results are obtained when the following amines are employed in lieu of dodecyldimethylamine in that the corresponding betaines are obtained: decyldimethylamine; undecyldimethylamine; tridecyldimethylamine; tetradecyldimethylamine; pentadecyldimethylamine; hexadecyldimethylamine; heptadecyldimethylamine; octadecyldimethylamine; dodecyldiethylamine; tetradecyldiethylamine; and octadecylmethylethylamine.

Example II 383 g. of $C_{16/18}$ alkyldimethylamine were placed in a stirred reaction vessel, open to atmosphere via a reflux condenser, and mixed with 882 g. of water containing a little caustic soda. The mixture was heated to boiling point and 204 g. of sodium chloracetate, in fine crystalline form were added and mixed in. The initial alkalinity was such that immediately after mixing in the chloracetate the pH of the mixture was 8. The mixture was stirred and kept boiling under reflux for 4½ hours, and during this period caustic soda was added as necessary to maintain the pH in the range 7.5–8.0. The total amount of caustic soda used was 82 g. of 10 N solution. The completeness of conversion of amine to betaine derivative was 98.5%.

Similar results are obtained when the following salts of halocarboxylic acids are employed in lieu of sodium chloracetate in that the corresponding betaine compounds are obtained: sodium bromoacetate; potassium chloracetate; potassium bromoacetate; sodium α-chloropropionate; sodium β-chloropropionate; potassium β-propionate; ammonium chloracetate; sodium γ-chlorobutyrate; ammonium γ-bromobutyrate; sodium Δ-chlorovalerate.

Example III 300 g. of $C_{12/14}$ alkyldimethylamine and 826 g. of water, containing a little caustic soda were reacted as in Examples I and II with 197 g. sodium chloracetate, but the reaction temperature was 80° C. The mixture was maintained at this temperature for 10 hours, the pH being maintained at 7.5–8 throughout. The total amount of caustic soda added was 53 g. of 10 N solution. The completeness of conversion of amine to betaine derivative was 99.3%.

Example IV 300 g. of the $C_{12/14}$ alkyldimethylamine of Example III and 826 g. of water containing a little caustic soda were reacted with 205 g. of sodium chloracetate, as in Examples I and II but the reaction temperature was 50° C. This temperature was maintained, and the pH held in the range 7.5–8. After 24 hours the completeness of conversion of amine to betaine derivative was 90%, rising to 99.4% after 50 hours.

Similar results are obtained in Examples III and IV when a mixture of $C_{16/18}$ alkyldimethylamine is employed in lieu of the mixture of $C_{12}$ and $C_{14}$ alkyldimethylamine in that the corresponding betaine compounds are obtained.

What is claimed is:

1. A process for preparing betaines in improved yield which comprises admixing a tertiary amine of the formula $R_1R_2R_3N$ wherein $R_1$ is alkyl of from 10 to 18 carbon atoms and $R_2$ and $R_3$ are each alkyl of from 1 to 3 carbon atoms with an amount of water sufficient to provide a stirrable reaction mixture; heating the mixture at a temperature of about 20° C. to about 110° C.; adding at a pH from 7 to 8 at least a stoichiometric amount with respect to said amine of a substantially dry, particulate salt of the formula $XR_4COOM$ wherein X is halogen, $R_4$ is alkylene of 1 to 4 carbon atoms and M is alkali metal or ammonium; and continuing said heating, while adding sufficient alkali to maintain the pH within the range of from 7 to 8, until the reaction is substantially complete.

2. The process of claim 1 wherein the alkyl groups $R_2$ and $R_3$ are methyl groups.

3. The process of claim 2 wherein the alkyl group $R_1$ has 12 to 14 carbon atoms or is a mixture of such groups.

4. The process of claim 3 wherein the salt of halocarboxylic acid is sodium chloracetate.

5. The process of claim 4 wherein the salt of the halocarboxylic acid is present in 20 to 30% excess.

6. The process of claim 5 wherein an aqueous dispersion is formed by mixing the tertiary amine with water.

7. The process of claim 6 wherein the pH of the reaction mixture is maintained at from 7 to 8 throughout the reaction by continuous or intermittent addition of aqueous alkali.

8. The process of claim 7 wherein the reaction temperature is from 40° C. to the boiling point at atmospheric pressure.

9. The process of claim 8 wherein the reaction temperature is from 70° C. to the boiling point at atmospheric pressure.

10. The process of claim 8 wherein the reaction temperature is from 80° C. to the boiling point at atmospheric pressure.

11. The process of claim 10 wherein the reaction is carried out at the boiling point of the mixture.

References Cited
UNITED STATES PATENTS

| | | | |
|---|---|---|---|
| 2,804,474 | 8/1957 | Lew | 260—501.13 |
| 2,082,275 | 6/1937 | Daimler et al. | 260—501.13 |

LEON ZITVER, Primary Examiner

M. W. GLYNN, Assistant Examiner